(12) United States Patent
Johansson et al.

(10) Patent No.: US 9,637,004 B2
(45) Date of Patent: May 2, 2017

(54) SYSTEM AND METHOD FOR DELIMITING REGENERATIVE BRAKING

(71) Applicant: e-AAM Driveline Systems AB, Trollhättan (ES)

(72) Inventors: Olle Johansson, Ljungskile (SE); Emil Gavling, Trollhättan (SE); Peter Stavered, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 16 days.

(21) Appl. No.: 14/743,135

(22) Filed: Jun. 18, 2015

(65) Prior Publication Data

US 2016/0368384 A1    Dec. 22, 2016

(51) Int. Cl.
*B60L 7/18*    (2006.01)
*B60T 8/1755*    (2006.01)
*B60L 3/10*    (2006.01)

(52) U.S. Cl.
CPC ............... *B60L 7/18* (2013.01); *B60L 3/102* (2013.01); *B60T 8/17552* (2013.01); *B60T 2270/613* (2013.01); *Y10S 903/947* (2013.01)

(58) Field of Classification Search
CPC .... G06G 7/76; G05D 1/00; B60L 7/18; B60L 3/102; B60T 8/17552; B60T 2270/613; Y10S 903/947
See application file for complete search history.

(56) References Cited

U.S. PATENT DOCUMENTS

| | | | |
|---|---|---|---|
| 4,962,969 A | 10/1990 | Davis | |
| 6,691,013 B1 | 2/2004 | Brown | |
| 7,104,617 B2 | 9/2006 | Brown | |
| 8,554,441 B1 | 10/2013 | Johansson et al. | |
| 8,788,144 B2 | 7/2014 | Krueger et al. | |
| 8,862,356 B2 | 10/2014 | Miller | |

(Continued)

FOREIGN PATENT DOCUMENTS

| | | |
|---|---|---|
| DE | 102013214806 A1 | 9/2014 |
| WO | 2013045584 A1 | 4/2013 |

OTHER PUBLICATIONS

International Search Report and Written Opinion dated Sep. 28, 2016 for corresponding International application PCT/IB2016/053628, filed Jun. 17, 2016, 10 pages.

*Primary Examiner* — Michael D Lang
(74) *Attorney, Agent, or Firm* — Harness, Dickey & Pierce, P.L.C.

(57) ABSTRACT

The present disclosure relates to a method for controlling an application of regenerative brake torque to a plurality of wheels of at least one of a hybrid electric vehicle or an electric vehicle, to avoid brake instability. The method may involve sensing variables such as an angle of a steering wheel of the vehicle, a speed of the vehicle, a brake pedal rate as an operator engages a brake pedal, and a wheel slip of each of the front and rear wheels. A commanded lateral acceleration may be determined representing a steady state lateral acceleration that the vehicle would reach at an actual vehicle speed and with a presently sensed steering wheel angle. The application of regenerative brake torque can then be controlled based on the sensed wheel slips relative to at least one predetermined wheel slip limit. The predetermined wheel slip limit is determined based at least in part on the determined commanded lateral acceleration.

20 Claims, 9 Drawing Sheets

(56) References Cited

U.S. PATENT DOCUMENTS

| | | | | |
|---|---|---|---|---|
| 2004/0046448 | A1* | 3/2004 | Brown | B60K 6/44 |
| | | | | 303/152 |
| 2011/0125382 | A1* | 5/2011 | Bonfigt | B60T 8/175 |
| | | | | 701/71 |
| 2011/0276245 | A1* | 11/2011 | Krueger | B60T 8/17616 |
| | | | | 701/71 |
| 2012/0133202 | A1* | 5/2012 | Mui | B60L 3/10 |
| | | | | 303/152 |
| 2014/0358397 | A1 | 12/2014 | Gao et al. | |

* cited by examiner

| Test Case | Electric Coast Torque | RbLim | μ | Vehicle Speed | Steering Wheel Angle | Body Slip Angle (max) |
| --- | --- | --- | --- | --- | --- | --- |
| | | | [-] | [km/h] | [°] | [°] |
| FWD | 0 | N/A | 0,15 | ~40 | ~0 | 5 |
| AWD | Std | on | 0,15 | ~40 | ~0 | 4 |
| HYBRID | 750 | off | 0,15 | ~40 | ~0 | 180 |
| HYBRID | 500 | off | 0,15 | ~40 | ~0 | 180 |
| HYBRID | 400 | off | 0,15 | ~40 | ~0 | 4 |
| HYBRID | 300 | off | 0,15 | ~40 | ~0 | 3 |
| HYBRID | 210 | off | 0,15 | ~40 | ~0 | 3 |
| HYBRID | 1000 | off | 0,4 | ~60 | ~0 | <1 |
| HYBRID | 750 | on | 0,4 | ~60 | ~0 | <1 |

FIG. 2

| Test Case | Electric Coast Torque | RbLim | μ [-] | Vehicle Speed [km/h] | Steering Wheel Angle [°] | Body Slip Angle (max) [°] |
|---|---|---|---|---|---|---|
| FWD | 0 | N/A | 0,15 | ~40 | 23,5 | 1 |
| HYBRID | 400 | off | 0,15 | ~40 | 23 | 26 |
| HYBRID | 750 | off | 0,15 | ~40 | 23,5 | 180 |
| HYBRID | 750 | on | 0,15 | ~40 | 24,5 | 5 |
| HYBRID | 220 | off | 0,15 | ~40 | 25 | 1 |
| HYBRID | 300 | off | 0,15 | ~40 | 26 | 15 |
| HYBRID | 400 | on | 0,15 | ~40 | 23,5 | 3 |

FIG. 5

SYSTEM AND METHOD FOR DELIMITING REGENERATIVE BRAKING

FIELD

The present disclosure relates to regenerative braking systems for use with electrically powered vehicles, and more particularly to a system and method for controlling regenerative braking in a manner that controls delimiting of the regenerative braking to better maintain the vehicle stable during braking maneuvers.

BACKGROUND

The statements in this section merely provide background information related to the present disclosure and may not constitute prior art.

In a vehicle that is driven completely, or partly, by an electrical machine, kinetic energy can be regenerated to electrical energy and stored in a battery during braking. This is what is referred to as "regenerative braking." Another term for this type of energy conversion is "recuperative braking."

In a hybrid electric vehicle (HEV), regenerative braking provides by far the biggest fuel savings compared to other typical HEV techniques (e.g., stopping internal combustion engine when not used/needed, engine load point shifting, etc.). In a "Battery Electric Vehicle" (BEV), regenerative braking extends the driving range of the vehicle. If the vehicle has a standard brake system (e.g., with an antilock braking system (ABS), TCS and ESP), regenerative braking will be added on top of the braking via the foundation brake system, as requested by the braking action applied by the driver, and potentially modulated by the brake controller system of the vehicle.

With any HEV, an important objective is maximizing regenerative braking while still keeping the vehicle stable during braking maneuvers. Avoiding rear "over-braking", that is excessive regenerative braking applied to the rear wheels of the vehicle, is especially important. This has been a significant challenge for various prior art systems.

SUMMARY

In one aspect the present disclosure relates to a method for controlling an application of regenerative brake torque to a plurality of wheels of at least one of a hybrid electric vehicle or an electric vehicle, to avoid brake instability. The method may comprise sensing an angle of a steering wheel of the vehicle; sensing a speed of the vehicle; sensing a brake pedal position as an operator of the vehicle engages a brake pedal of the vehicle; sensing a wheel slip of each of a pair of front wheels of the vehicle; and sensing a wheel slip of each one of a pair of rear wheels of the vehicle. A commanded lateral acceleration may be determined representing a steady state lateral acceleration that the vehicle would reach at an actual vehicle speed and with a presently sensed steering wheel angle. The application of regenerative brake torque may then be controlled based on the sensed wheel slips relative to at least one predetermined wheel slip limit. At least one predetermined wheel slip limit is determined based at least in part on the determined commanded lateral acceleration.

In another aspect the present disclosure relates to a method for controlling an application of regenerative brake torque to a plurality of wheels of at least one of a hybrid electric vehicle or an electric vehicle, to avoid brake instability. The method may comprise sensing a brake pedal position as an operator of the vehicle engages a brake pedal of the vehicle; determining a commanded lateral acceleration representing a steady state lateral acceleration that the vehicle would reach at an actual vehicle speed and with a presently sensed steering wheel angle. The method may also involve sensing a wheel slip of each one of a pair of front wheels of the vehicle and determining therefrom a minimum front wheel slip for the two front wheels. A wheel slip of each of a pair of rear wheels of the vehicle may also be sensed and used to determine a maximum rear wheel slip for the two rear wheels. The application of regenerative brake torque may be controlled such that the regenerative brake torque is not allowed to increase in response to brake pedal movement, but is instead is maintained constant in a hold condition, when either of the following conditions occurs: the maximum rear wheel slip exceeds a first predetermined limit; or the maximum rear wheel slip exceeds the front wheel minimum slip by a second predetermined limit. The first and second predetermined limits are determined based at least in part on the determined commanded lateral acceleration.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a chart presenting a summary of test cases and test conditions under which specific tests were conducted using a system and method in accordance with the present disclosure;

FIG. 5 shows a chart of test conditions for tests conducted on a vehicle while coasting during cornering;

DETAILED DESCRIPTION

Figure 1A:
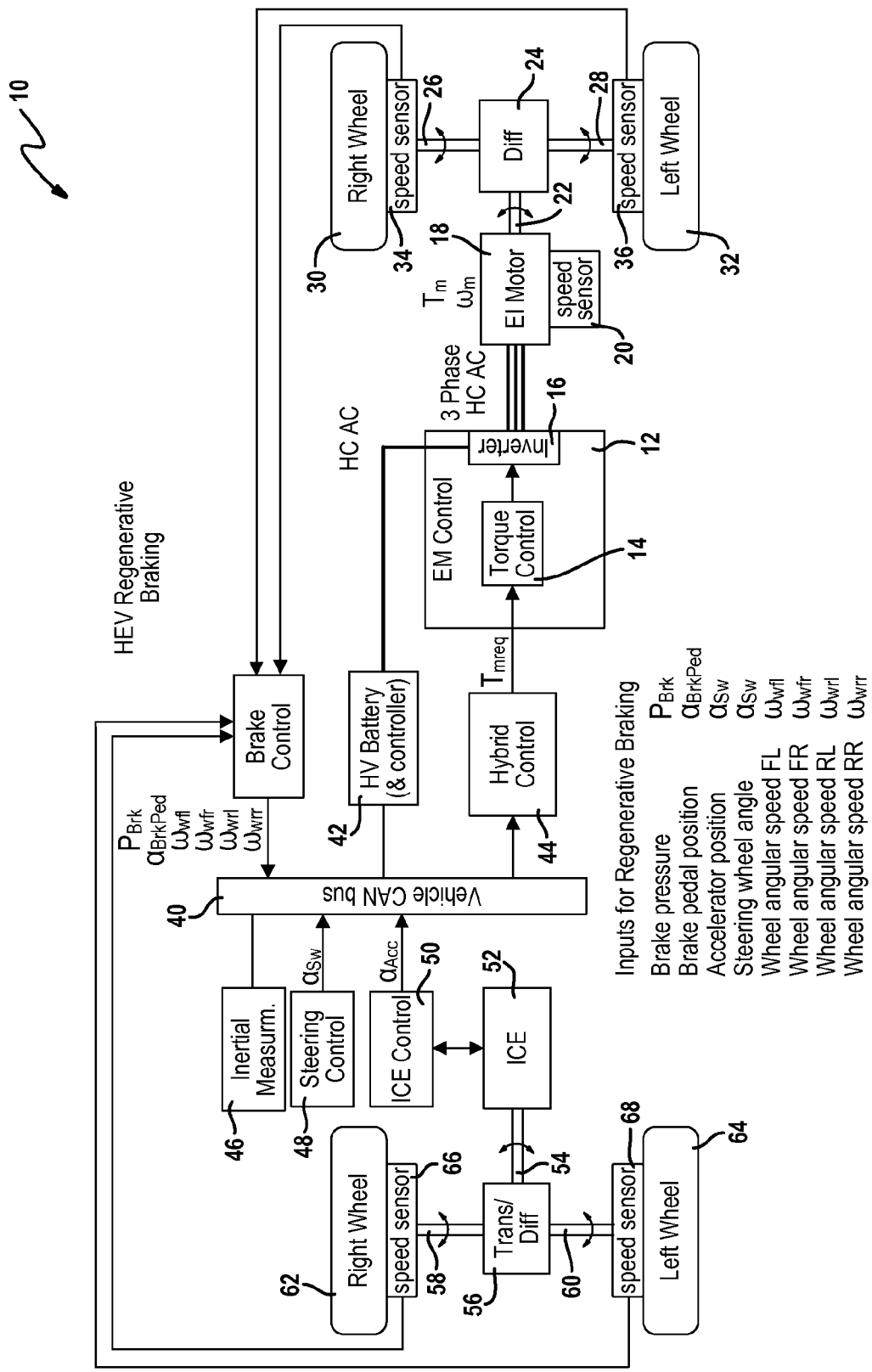
FIG. 1A is a high level block diagram of typical major components of a hybrid electric vehicle (HEV) in which the regenerative braking system and method of the present disclosure is implemented.

The following description is merely exemplary in nature and is not intended to limit the present disclosure, application, or uses. It should be understood that throughout the drawings, corresponding reference numerals indicate like or corresponding parts and features.

Referring to FIG. 1A a high level block diagram is shown of various components of a hybrid electric vehicle (HEV) 10 incorporating a regenerative braking system in accordance with the present disclosure. The HEV 10 in this example may include an electric motor control subsystem 12 having a torque control subsystem 14 and an inverter 16. An output of the inverter 16 may be fed into an electric motor 18. A speed sensor 20 may be used to monitor the speed of an output shaft 22 of the electric motor 18. The output shaft 22 may apply an input drive signal to a rear differential 24. The rear differential 24 has axles 26 and 28 which are used to drive the rear right wheel (RRW) 30 and rear left wheel (RLW) 32 respectively. Speed sensors 34 and 36 are used to detect the speed of each wheel 30 and 32, respectively.

The outputs of the speed sensors 34 and 36 are transmitted to a brake control subsystem 38. The brake control subsystem 38 transmits the speed signals sensed by the sensors 34 and 36 ($\omega_{wfl}$, $\omega_{wfr}$, $\omega_{wrl}$, and $\omega_{wrr}$), along with a brake pressure signal (PBrk) and a brake pedal position signal ($\alpha$BrkPed) to a vehicle CAN (Controller Area Network) bus 40. A high voltage (HV) battery and controller subsystem 42 and a processor based hybrid control system 44 are also in communication with the CAN bus 40. The hybrid control system 44 may receive the following inputs:

Initial Inputs for Regenerative Braking

| Brake pressure | $P_{Brk}$ |
| Brake pedal position | $\alpha_{BrkPed}$ |
| Accelerator position | $\alpha_{Sw}$ |
| Steering wheel angle | $\alpha_{Sw}$ |
| Wheel angular speed FL | $\omega_{wfl}$ |
| Wheel angular speed FR | $\omega_{wfr}$ |
| Wheel angular speed RL | $\omega_{wrl}$ |
| Wheel angular speed RR | $\omega_{wrr}$ |
| Vehicle Speed | $v_{Veh}$ |

The hybrid control system 44 uses the above-listed inputs to generate a torque request ($T_{mreq}$) signal which is input to the torque control subsystem 14. The Tmreq signal represents an internal signal on the CAN bus 40. $T_{mreg}$ is the target for the torque control. The torque control controls the three phase AC current to achieve the target torque on the electric motor 18 axle input to the differential 24.

The CAN bus 40 also receives inputs from an inertial measurement system 46, a steering control subsystem 48, and an internal combustion engine (ICE) control subsystem 50. The ICE control system 50 is operatively associated with an internal combustion engine (ICE) 52 of the HEV 10 and able to receive inputs from sensors associated with the ICE 52, as well as to apply signals to various electronic and/or electromechanical components associated with the ICE 52.

Referring further to FIG. 1A, the ICE 52 has an output shaft 54 which drives a front transmission/differential subsystem 56. The transmission/differential subsystem 56 in turn applies rotational torque to each of drives axles 58 and 60 associated with the front right wheel (FRW) 62 and front left wheel (FLW) 64. Speed sensors 66 and 68 sense the angular speeds of the FRW 62 and the FLW 64, respectively, and send electrical signals in accordance therewith to the brake control subsystem 38.

Regenerative Braking Algorithm

Figure 1B:
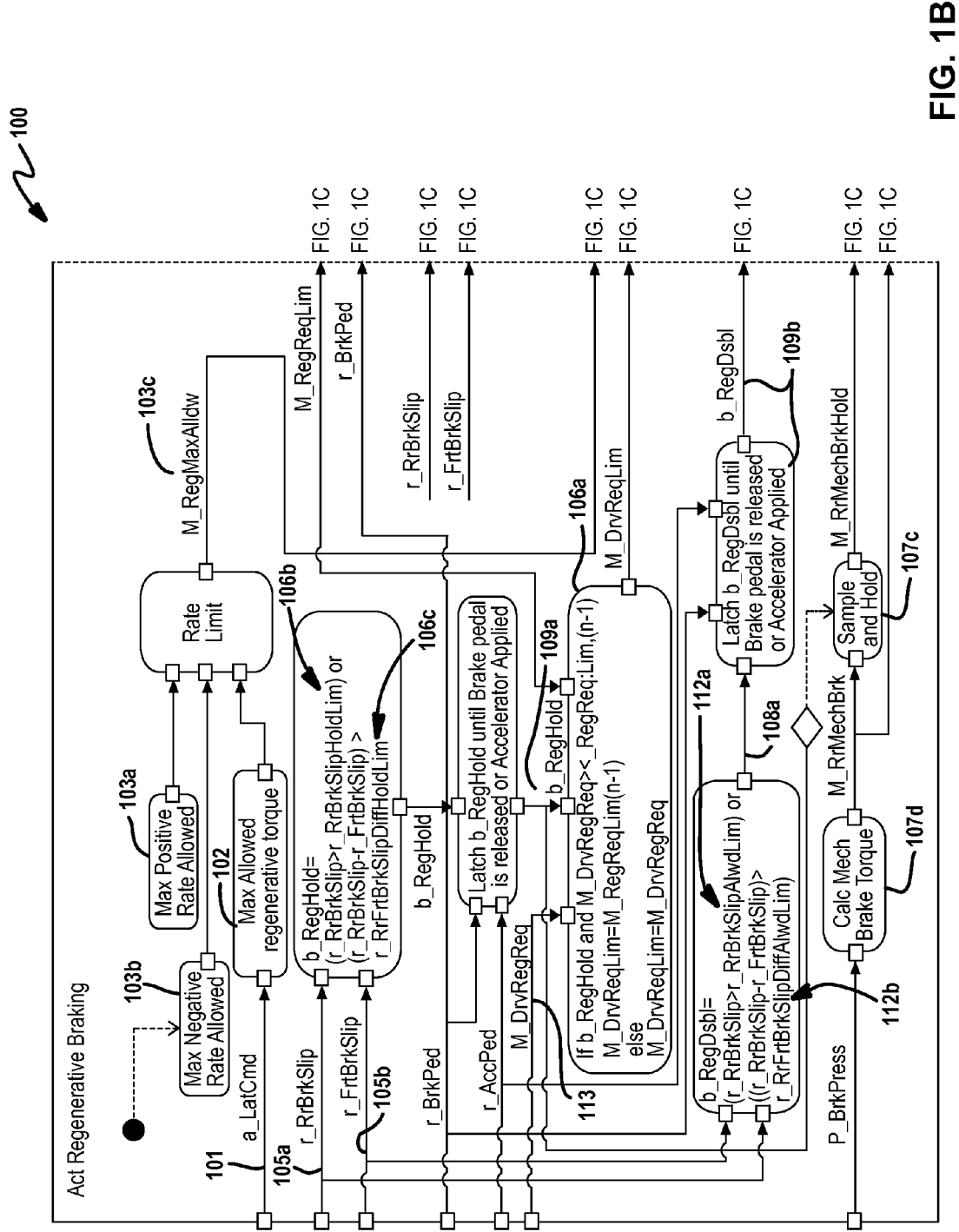
FIG. 1B-1C is an activity flow diagram illustrating operation of the present system and method.
Figure 1C:
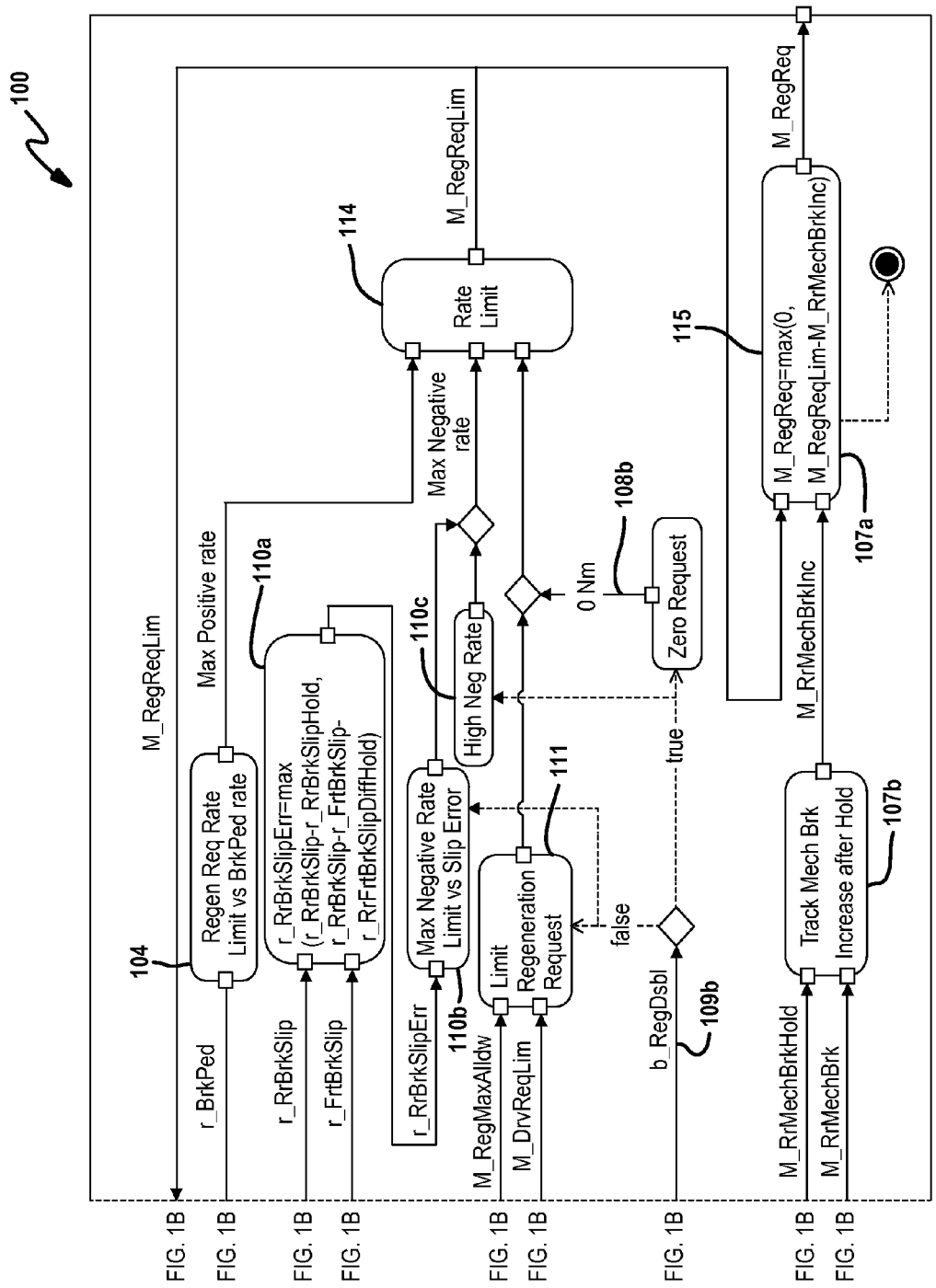

The present disclosure is not focused simply on defining a regenerative brake torque based on a driver request (i.e., from the accelerator and brake pedal position), but rather on more effectively limiting a request for regenerative brake torque to better avoid instability when braking the vehicle. The present disclosure is further related to how to eventually cancel regenerative braking in the event the margin for brake instability is determined to be too low. In one aspect, the regenerative braking control methodology of the present disclosure effectively makes use of the commanded lateral acceleration to help limit regenerative braking. Referring to FIG. 1B-1C, an activity diagram 100 is shown which represents an algorithm (i.e., methodology) by which the system 10 operates. In summary, and with reference to the activity diagram 100, the present disclosure involves monitoring and/or controlling a number of variables as discussed below.

Initially, the Commanded Lateral Acceleration, i.e., the steady state Lateral Acceleration the vehicle would reach at the actual Vehicle Speed and Steering Wheel Angle, is monitored (101).

The Max Allowed Regenerative Brake Torque (102), which is a function of Commanded Lateral Acceleration, to improve brake stability during cornering, is rate limited with individual calibrations for increasing (103a) and decreasing (103b) regenerative braking scenarios, to provide the final Max Allowed Regenerative Brake Torque (103c). This Max allowed torque is the limit when no rear rear brake instability have been detected. Typically, a fast decrease rate is allowed to avoid brake instability and a slow increase rate is used to improve drivability.

Rear Brake stability is estimated by monitoring Rear Wheel Slip (max of left/right) (105a) and Front Wheel Slip (min of left/right) (105b).

Driver Requested Regenerative Brake Torque (113) is not allowed to increase (e.g., as a function of brake pedal) providing a limited Driver Requested Regenerative Brake torque (106a) if rear wheel slip exceeds a limit (R_RrBrk-SlipHoldLim, 106b) or if rear wheel max slip exceeds front wheel slip with another limit (R_RrFrtBrkSlipDiffHoldLim) (106c). Thus, either condition of rear slip exceeding R_RrBrkSlipHold Lim or rear/front difference exceeding R_RrFrtBrkSlipDiffHold Lim can lead to a "Hold condition" (i.e., when Reqenerative brake torque isn't allowed to increase);

The Hold condition(109a) is latched until the driver releases the brake pedal and applies some degree of accelerator input.

The potentially Limited driver request, due to Hold Condition, is then limited with final Max Allowed Regenerative Brake Torque (111).

The Max Positive rate of change (104), of the limited regeneration request (114), will be a function of Brake Pedal Rate. The Rate is obtained from The Brake Pedal Position via time derivation and low pass filtering.

A low Brake pedal rate =>Low Regenerative Brake Torque change rate. By doing so, increased maximum allowed regenerative brake torque can be smoothly made available when the driver holds the brake pedal still. If on the other hand a change in brake pedal rate is sensed, the request will be followed with a higher response, and therefore improved controllability.

Regenerative braking is disabled (108a) if rear wheel slip (max of left/right) exceeds a limit (R_RrBrkSlipAlwdLim) (112a) or if rear wheel max slip exceeds front wheel slip (min of left/right) with another limit (R_RrFrtBrkSlipDiffAlwdLim) (112b) =>Regeneration Disable (108b).

The Disable (109b) conditions are latched until the driver releases the brake pedal and applies some degree of accelerator input.

The rate of disabling regenerative brake torque (110b) is a function of how serious the brake instability is. The measure for brake instability is the Slip Error (110a) (i.e., how much the rear slip or rear/front slip difference have changed after the Regen Hold Condition (110a)). If Regenerative torque is not disabled a High Negative rate is allowed (110c).

Allowed regenerative brake torque is reduced (107a) with the increase of foundation brake torque (107b) occurring after the hold condition (109a).

The limits R_RrBrkSlipHoldLim, R_RrFrtBrkSlipDiffHoldLim, R_RrBrkSlipAlwdLim and R_RrFrtBrkSlipDiffAlwdLim are all a function of commanded lateral acceleration (not shown in FIG. 1B-1C) to improve brake stability during cornering.

Listing of Inputs, Outputs and Internal States

The following is a detailed listing of inputs, outputs, and internal states that are used by a regenerative braking algorithm (i.e., methodology) implemented by the present disclosure:

Transformations to Initial Inputs to Produce
Inputs For FIG. 1A Activity Flow Diagram $M\_DrvRegReq = f(\alpha_{Sw}, v_{Veh})$
$r\_RrBrkSlip = f(\omega_{wrl}, \omega_{wrr}, v_{Veh})$
$r\_FrtBrkSlip = f(\omega_{wfl}, \omega_{wfr}, v_{Veh}, \alpha_{Sw})$
$a\_LatCmd = f(v_{Veh}, \alpha_{Sw})$

| Inputs | |
|---|---|
| M_DrvRegReq | Driver Requested Regen Brake Torque |
| r_RrBrkSlip | Rear Brake Slip (maximum of Left and Right Rear Brake Slip) |
| r_FrtBrkSlip | Front Brake Slip (minimum of Left and Right Front Brake Slip) |
| a_LatCmd | Commanded Lateral Acceleration. The steady state Lateral acceleration the vehicle would reach at the actual vehicle speed and steering wheel angle. |
| r_BrkPed | Brake pedal position |
| r_AccPed | Accelerator pedal position |
| P_Brk_Press | Master Cylinder Brake pressure |
| Output | |
| M_ReqReq | Final Regen Brake Torque request |

AAM Regen Braking Algorithm Internal States.
Internal Variables

| | |
|---|---|
| r_RrBrkSlipHoldLim | Hold Rear Brake Longitudinal Slip limit. This is defined as a base calibration multiplied by one or more factors that are functions of, e.g., a_LatCmd |
| r_RrFrtBrkSlipDiffHoldLim | Hold Rear/Front Brake Slip Differential limit Is defined as a base calibration multiplied by one or more factors that are functions of, e.g., a_LatCmd |
| r_RrBrkSlipAlwdLim | Allowed Rear Brake Longitudinal Slip. Is defined as a base calibration multiplied by one or more factors that are functions of, e.g., a_LatCmd |
| r_RrFrtBrkSlipDiffAlwdLim | Allowed Rear/Front Slip Longitudinal Differential. Is defined as a base calibration multiplied by one or more factors that are functions of, e.g., a_LatCmd |
| r_RrBrkSlipErr | Rear Brake Slip error |
| b_RegHold | Logical state that r_RrBrkSlip or r_RrBrkSlip-r_FrtBrkSlip exceeds a hold level (below) |
| b_RegDsbl | Logical state that r_RrBrkSlip or r_RrBrkSlip-r_FrtBrkSlip exceeds an allowed level (below) |
| M_RegMaxAlldw | Max allowed Regeneative Torque. A function of Commanded Lateral Acceleration |
| M_DrvRegLim | Limited M_DrvRegReq due to Hold condition |
| M_RegRegLim | Final Limited Regeneration Request before reduction with Mechanic brake increase after Hold Condition |
| M_DrvRegReqHold | M_DrvRegReq sampled and stored at b_RegHold condition |
| M_RrMechBrk | Mechanical rear Brake Torque = K*BrakePressure where K depends on rear wheel brake cylinder diameter, rear brake disc effective radius, and rear brake pad friction coefficient |
| M_RrMechBrkHold | M_RrMechBrk sampled at b_RegHold condition |
| M_RrMechBrkInc | Max increase of Mechanical rear Brake Torque since b_RegHold condition |

In the following description of the regenerative braking algorithm of the present disclosure, Brake Slip and Regenerative Brake Torque are positive at braking. This doesn't have to be the case in actual implementation and should not limit this application.

The Max Allowed Regenerative Torque (M_RegMaxAlldw, 102) is set as a function of Commanded Lateral Acceleration (a_latCmd, 101). The rate of change is limited separately for increasing (103a) and decreasing (103b) (calibrations) providing the final M_RegMaxAlldw (103c). This Max allowed torque is the limit when no rear rear brake instability have been detected.

The Brake Slip of the front and rear wheels are continuously monitored to determine the maximum (i.e., the greater one of) the left and right front brake slip (r_FrtBrkSlip, 105a) and the maximum of the left and right rear brake slip (r_RrBrkSlip, 105b).

If r_RrBrkSlip is higher than r_RrBrkSlipHoldLim (106b) or r_RrBrkSlip-r_FrtBrkSlip is higher_RFrtrBrkSlipDiffHoldLim (106c) then b_RegHold will be set=true b_RegHold will be latched (109a) for the active brake cycle i.e. until the Brake pedal is released and some Accelerator is applied (removing Coast brake request).

The Driver Requested Regenerative Torque (113) is not allowed to increase if b_RegHold is true providing a limited Driver Requested Regenerative Brake torque (M_Drv_RegLim, 106a).

M_Drv_RegLim is further limited by M_RegMaxAlldw (111).

If Regeneration is not disabled by b_RegDsbl (109b), described below, M_Drv_RegLim is then rate limited providing M_RegReqLim (114).

The Allowed rate of change for increasing torque (104) is a function of Brake Pedal rate. A low pedal rate=>Low Regenerative Brake Torque change rate.

When Regeneration is not disabled the allowed decreasing torque rate is a constant High Neg Rate(calibration).

The Mechanical Rear Brake Torque (M_RrMechBrk, 107d) torque is continuously calculated from Brake Pressure (P_Brk_Press).

When the hold condition b_RegHold gets true the M_RrMechBrk is sampled in M_RrMechBrkHold (107c).

If now the driver brakes harder the M_RrMechBrk will increase, after b_RegHold. The increase of mechanical brake M_RrMechBrkInc (107b) is kept track of according to: ((n) is used to indicate sample number n) M_RrMechBrkInc (n)=max(M_RrMechBrkInc (n-1), M_RrMechBrk (n) -M_RrMechBrkHold).

To avoid even higher rear brake slip, the Regen Brake Torque M_ReqReqLim is then reduced with the increase in M_RrMechBrk (but is not allowed to go negative) providing the final limited Regeneration Request M_RegReq (115):

M_ReqReq=max(0, M_DrvRegReqLim-M_RrMechBrkInc).

Normally this will keep the Rear Brake Slip well limited, but if r_RfBrkSlip r_RrBrkSlipAlwdLim or if r_RrBrkSlip-r_FrtBrkSlip exceeds r_RFrtrBrkSlipDiffAlwd, a regeneration diable condition b_RegDsbl (108a) is set b_RegDsbl will be latched for the active brake cycle i.e. until the Brake pedal is released and some Accelerator is applied (removing Coast brake request) (109b).

At b_RegDsbl the Regenerative braking is cancelled by ramping out the M_RegReqLim (114) at a rate defined by calibration and with a scaling factor that is a function of the Rear Brake Slip error (r_RrBrkSlipErr, 110a):

r_RrBrkSlipErr=max(r_RrBrkSlip-r_RrBrkSlipHold, r_RrBrkSlip-r_FrtBrkSlip-r_RFrtrBrkSlipDiffHold). A high r_RrBrkSlipErr means that r_RrBrkSlip or r_RrBrkSlip-r_FrtBrkSlip exceeds its hold level by a significant margin. A low r_RrBrkSlipErr means M_RegReq can be ramped out slowly for better comfort. A high r_RrBrkSlipErr will call for fast ramp out in favor of brake stability.

Figure 3A:
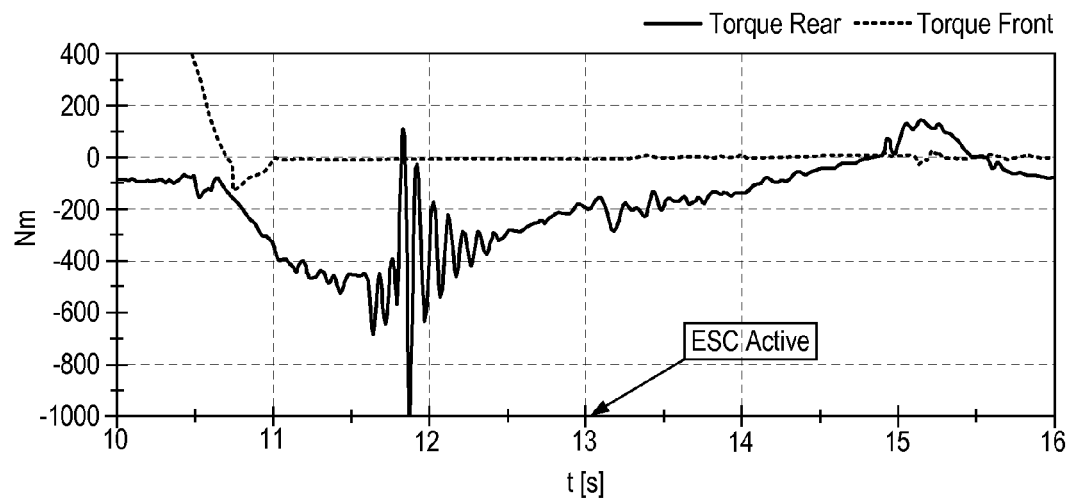
FIG. 3A is a plot of torque and the rear wheels and the front wheels relative to time, under a straight line coasting condition without the use of the system and method of the present disclosure, and wherein the vehicle has lost its grip and begins to spin.
Figure 3B:
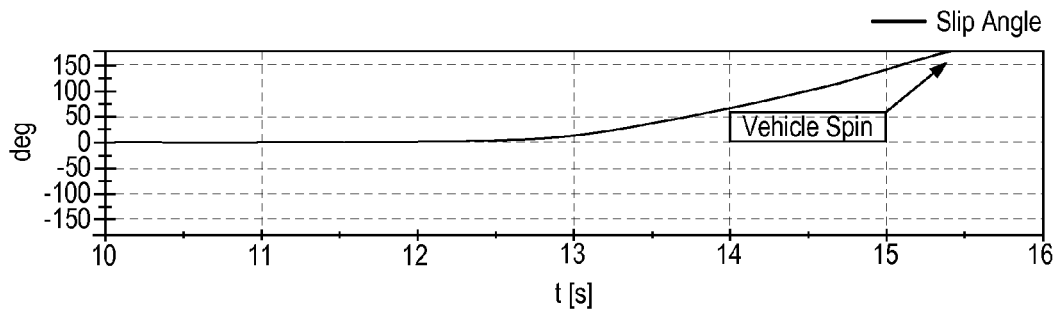
FIG. 3B is a plot of the slip angle of the vehicle in degrees relative to time, under the same conditions as described above for FIG. 3A.
Figure 3C:
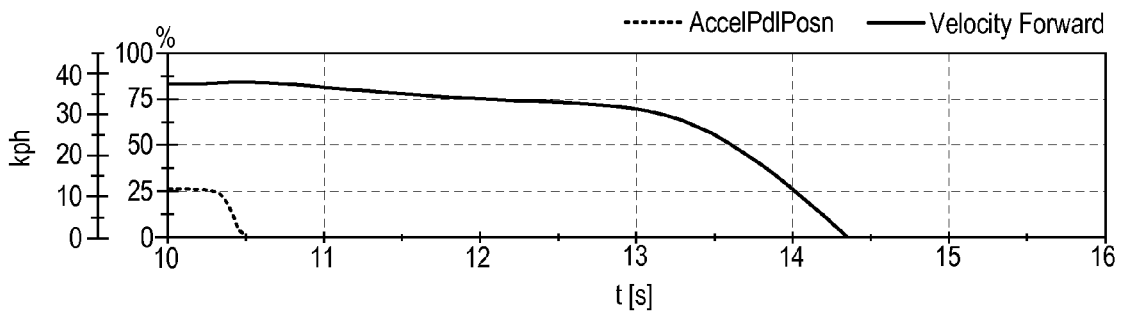
FIG. 3C shows graphs of the forward velocity of the vehicle (VelocityForward) and accelerator pedal position (AccelPdPosn) relative to time, with the vehicle under the same conditions as described above for FIG. 3A.
Figure 4A:
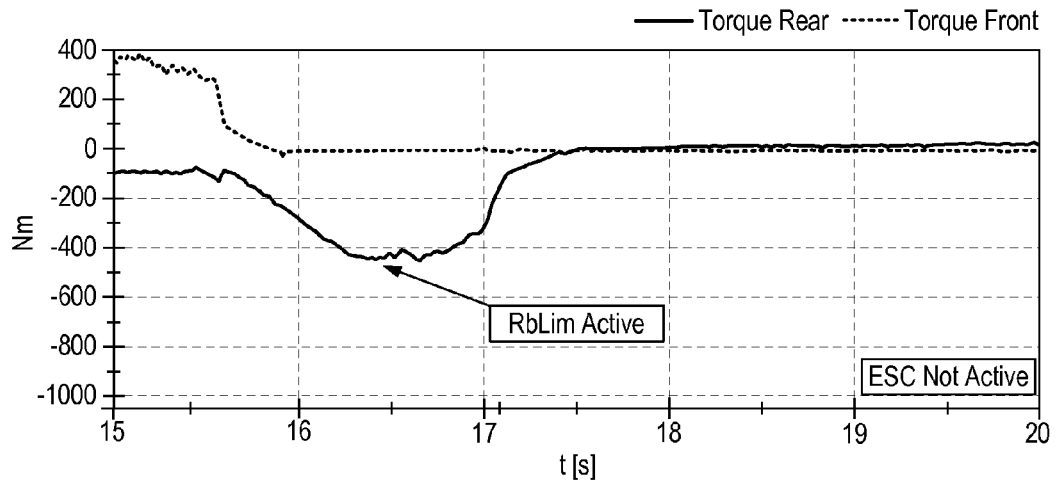
FIGS. 4A-4C show plots in relation to FIGS. 3A-3C, respectively, but with the system and method of the present disclosure being applied to control regenerative braking.
Figure 4B:
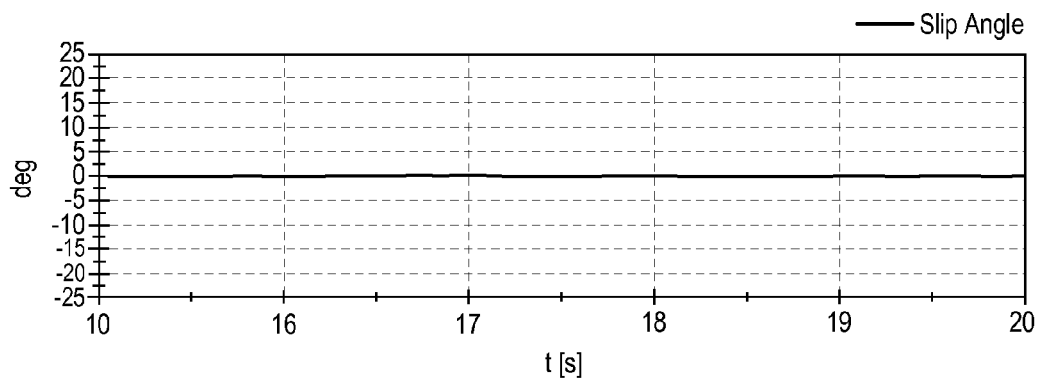
Figure 4C:
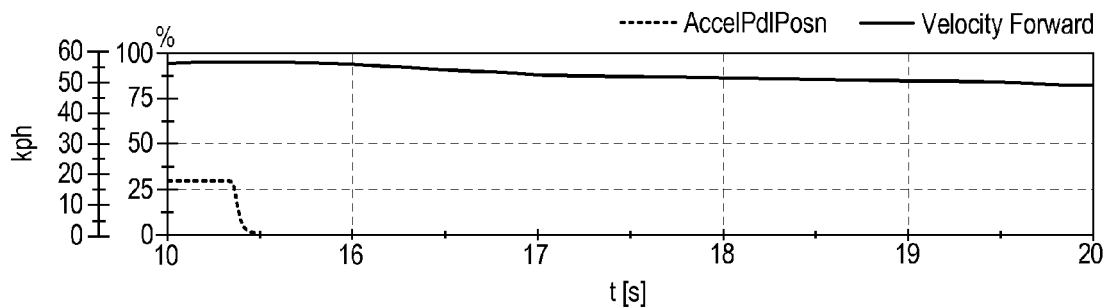

FIG. 2 shows a summary table of test results using the system and algorithm of the present disclosure for regenerative braking during a system straight line coasting condition, and where Rblim is turned off. In the following discussion the acronym "Rblim" represents the use of the algorithm (i.e., methodology) of the present disclosure for limiting brake torque FIGS. 3A-3C provide graphs illustrating front and rear torque (FIG. 3A), slip angle (FIG. 3B) and forward velocity relative to accelerator pedal position (AccelPdlPosn) (FIG. 3C) when coast braking a hybrid vehicle moving straight ahead on a low μ surface, with an electric coast torque of 750 Nm, with Rblim off. The Vehicle Slip Angle indicates if the vehicle spins in this test. FIGS. 4A-4C illustrate graphs of the same performance parameters but with Rblim on, and a maximum body slip angle of less than 1 degree, and with the vehicle on a low μ (0, 4) surface. In this example the vehicle stays stable. Note the body slip angle is defined as the angle between the vehicle velocity vector and the vehicle body forward direction. For straight line driving, the vehicle velocity shall point in the forward direction (i.e., the slip angle is close to 0).

Figure 6A:
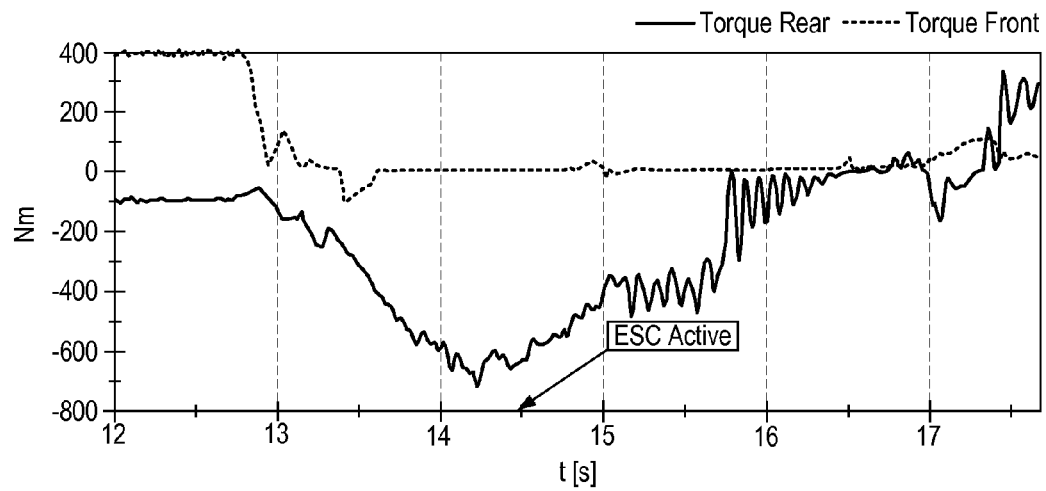
FIGS. 6A-6C illustrate the performance parameters described above corresponding to FIGS. 3A-3C, respectively, but without use of the system and method of the present disclosure, and when the vehicle has lost its grip and spins while coasting during a cornering maneuver.
Figure 6B:
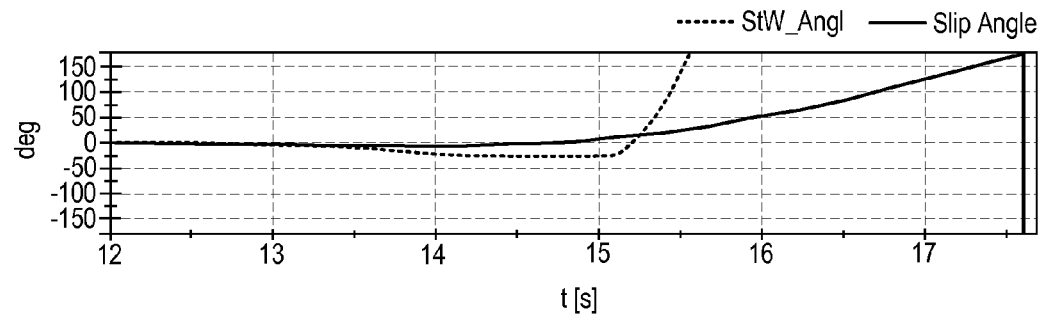
Figure 6C:
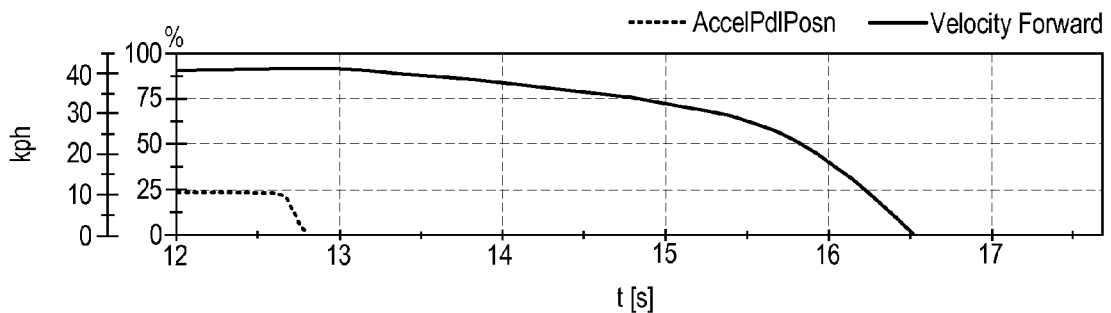

FIG. 5 illustrates a table of test results for regenerative coast braking during cornering. FIGS. 6A-6C illustrate the rear torque and the front torque each plotted relative to time (FIG. 6A), the slip angle and StW_Angl each plotted relative to time (FIG. 6B), and the VelocityForward and AccelPdPosn both plotted relative to time(FIG. 6C) with electric coast torque of 750 Nm in a corner from 40 kph with Rblim off. The Body Slip Angle indicates the vehicle spins in this test.

Figure 7A:
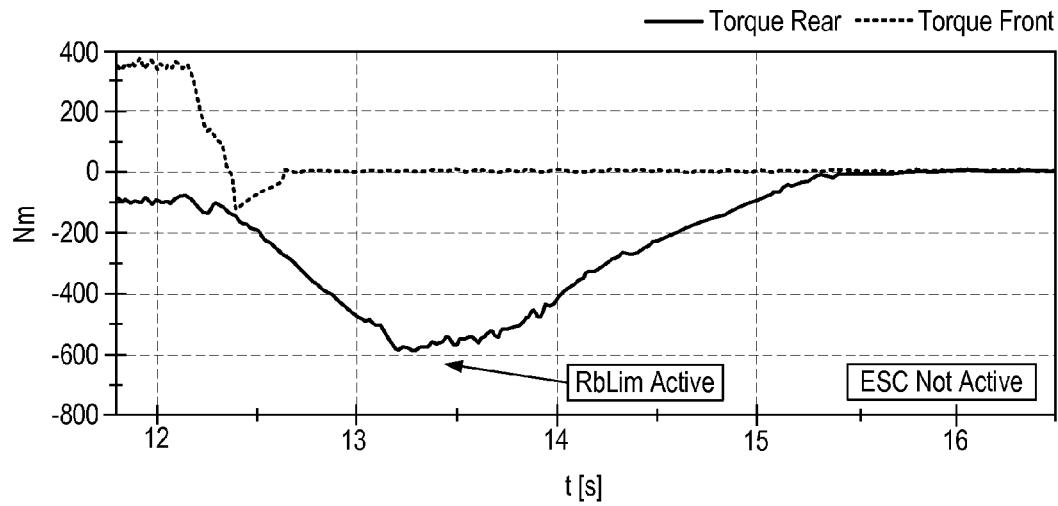
FIGS. 7A-7C illustrate plots in relation to FIGS. 6A-6C, respectively, but with the system and the method of the present invention being applied to control regenerative braking.
Figure 7B:
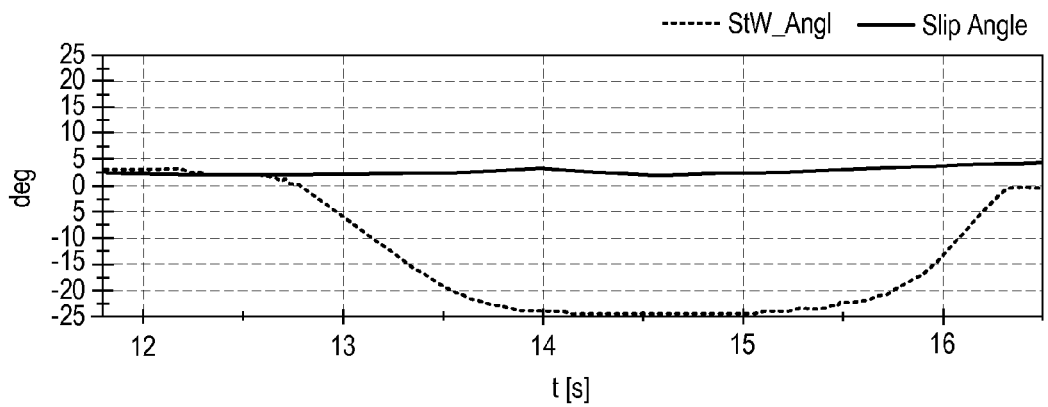
Figure 7C:
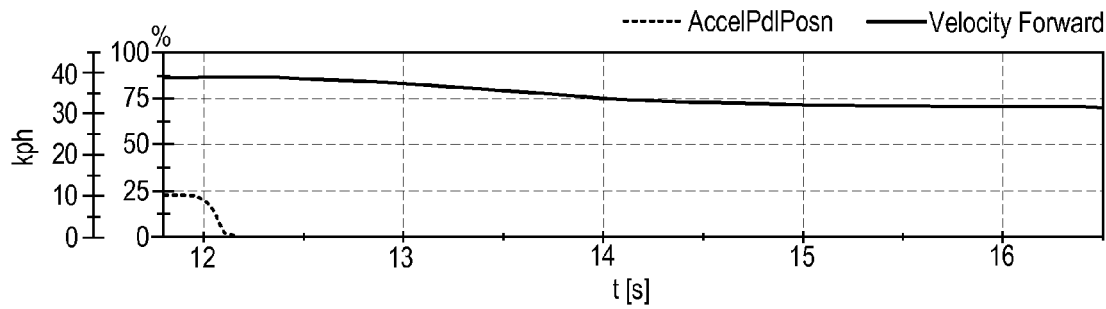

FIGS. 7A-7C illustrate the change in performance from the graphs of FIGS. 6A-6C when Rblim is turned on. The vehicle stays stable with a Body Slip Angle less than 5 degrees.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for controlling an application of regenerative brake torque to a plurality of wheels of at least one of a hybrid electric vehicle or an electric vehicle, to avoid brake instability, the method comprising:
    sensing an angle of a steering wheel of the vehicle;
    sensing a speed of the vehicle;
    sensing a brake pedal position as an operator of the vehicle engages a brake pedal of the vehicle;
    sensing a wheel slip of each of a pair of front wheels of the vehicle;
    sensing a wheel slip of each one of a pair of rear wheels of the vehicle; determining a commanded lateral acceleration representing a steady state lateral acceleration that the vehicle would reach at an actual vehicle speed and with a presently sensed steering wheel angle;
    controlling the application of regenerative brake torque based on both of:
        an evaluation of the sensed wheel slips of the rear wheels relative to at least one predetermined wheel slip limit, and;
        an evaluation of the sensed slips of the pair of rear wheels relative to the sensed wheel slips of the pair of front wheels; and
    wherein the at least one predetermined wheel slip limit is determined based at least in part on the determined commanded lateral acceleration.

2. The method of claim 1, wherein:
    sensing a wheel slip of each of a pair of front wheels of the vehicle comprises determining therefrom a minimum front wheel slip for the two front wheels; and
    sensing a wheel slip of each of a pair of rear wheels of the vehicle comprises determining therefrom a maximum rear wheel slip for the two rear wheels.

3. The method of claim 2, wherein the controlling of the application of regenerative brake torque comprises controlling the regenerative brake torque such that the regenerative brake torque is not allowed to increase in response to brake pedal movement, but instead is maintained constant in a hold condition, when either of the following conditions occurs:
    the maximum rear wheel slip exceeds a first predetermined limit; or
    the maximum rear wheel slip exceeds the front wheel minimum slip by a second predetermined limit.

4. The method of claim 3, further comprising disabling the application of regenerative braking when either of the following conditions is present:
    the maximum rear wheel slip exceeds a third predetermined limit; or
    the maximum rear wheel slip exceeds the minimum front wheel slip by a fourth predetermined limit.

5. The method of claim 4, wherein the third and fourth predetermined limits are each a function of the commanded lateral acceleration and set with a goal of improving brake stability during cornering.

6. The method of claim 4, wherein the disabling of the application of regenerative braking is maintained until the operator of the vehicle removes pressure from the brake pedal and applies pressure to an accelerator pedal of the vehicle.

7. The method of claim 3, wherein the first and second predetermined limits are each a function of the commanded lateral acceleration and set with a goal of improving brake stability of the vehicle while the vehicle is cornering.

8. The method of claim 3, wherein the hold condition is latched until the operator of the vehicle removes pressure from the brake pedal and applies pressure to an accelerator pedal of the vehicle.

9. The method of claim 1, wherein a rate of change of a maximum allowable regenerative brake torque is individually controlled during conditions of decreasing and increasing regenerative brake torque such that:
   a first rate of change is allowed when the regenerative brake torque is decreasing, to thus help avoid brake instability; and
   a second rate of change, which is less than the first rate of change, is allowed when the regenerative brake torque is increasing, to thus improve drivability of the vehicle.

10. A method for controlling an application of regenerative brake torque to a plurality of wheels of at least one of a hybrid electric vehicle or an electric vehicle, to avoid brake instability, the method comprising:
   sensing a brake pedal position as an operator of the vehicle engages a brake pedal of the vehicle;
   determining a commanded lateral acceleration representing a steady state lateral acceleration that the vehicle would reach at an actual vehicle speed and with a presently sensed steering wheel angle;
   sensing a wheel slip of each one of a pair of front wheels of the vehicle and determining therefrom a minimum front wheel slip for the two front wheels;
   sensing a wheel slip of each of a pair of rear wheels of the vehicle and determining therefrom a maximum rear wheel slip for the two rear wheels;
   controlling the application of regenerative brake torque such that the regenerative brake torque is not allowed to increase in response to brake pedal movement, but is instead maintained constant in a hold condition, when either of the following conditions occurs:
   the maximum rear wheel slip exceeds a first predetermined limit; or
   the maximum rear wheel slip exceeds the front wheel minimum slip by a second predetermined limit; and
   wherein the first and second predetermined limits are determined based at least in part on the determined commanded lateral acceleration.

11. The method of claim 10, further comprising disabling the application of regenerative braking when either of the following conditions is present:
   the maximum rear wheel slip exceeds a third predetermined limit; or
   the maximum rear wheel slip exceeds the minimum front wheel slip by a fourth predetermined limit.

12. The method of claim 11, wherein when the application of regenerative brake torque has been disabled, maintaining the application of regenerative brake torque disabled until a condition is detected wherein the operator has released the brake pedal and has begun to modulate an accelerator pedal of the vehicle.

13. The method of claim 11, wherein the third predetermined limit and the fourth predetermined limit are each a function of the commanded lateral acceleration to improve brake stability during cornering.

14. The method of claim 10, wherein when the regenerative brake torque is being held constant in the hold condition, further maintaining the regenerative brake torque constant until a condition is detected wherein the operator has released the brake pedal and has begun to modulate an accelerator pedal of the vehicle.

15. The method of claim 10, wherein a rate at which the regenerative braking is disabled is a function of a determined level of brake instability.

16. The method of claim 10, further comprising controlling the application of regenerative brake torque such that an allowable level of regenerative brake torque is reduced with an increase in mechanical brake torque, provided by the vehicle, occurring after the hold condition.

17. A system for controlling an application of regenerative brake torque to a plurality of wheels of at least one of a hybrid electric vehicle or an electric vehicle, to avoid brake instability, the system comprising:
   a steering control sensor adapted to sense an angle of a steering wheel of the vehicle;
   a sensor for sensing a speed of the vehicle;
   a brake control adapted to sense a brake pedal rate as an operator of the vehicle engages a brake pedal of the vehicle;
   an inertial measurement system adapted to sense a wheel slip of each one of a pair of front wheels of the vehicle, and to sense a wheel slip of each one of a pair of rear wheels of the vehicle;
   a processor based hybrid control system adapted to:
   determine a commanded lateral acceleration representing a steady state lateral acceleration that the vehicle would reach at an actual vehicle speed and with a presently sensed steering wheel angle;
   control the application of regenerative brake torque based on both of:
      an evaluation of the sensed wheel slips of the rear wheels relative to at least one predetermined wheel slip limit; and
      an evaluation of the sensed wheel slips of the rear wheels relative to the sensed wheel slips of the front wheels; and
   wherein the at least one predetermined wheel slip limit is determined based at least in part on the determined commanded lateral acceleration.

18. The system of claim 17, wherein the processor based hybrid control system is further configured to sense wheel slip by:
   analyzing a wheel slip of each of a pair of front wheels of the vehicle and determining therefrom a minimum front wheel slip for the two front wheels; and
   analyzing a wheel slip of each of a pair of rear wheels of the vehicle comprises determining therefrom a maximum rear wheel slip for the two rear wheels.

19. The system of claim 18, wherein the hybrid control system is further configured to control the application of regenerative brake torque such that the regenerative brake torque is not allowed to increase in response to brake pedal movement, but instead is maintained constant in a hold condition, when either of the following conditions occurs:
   the maximum rear wheel slip exceeds a first predetermined limit; or
   the maximum rear wheel slip exceeds the front wheel minimum slip by a second predetermined limit; and wherein the first and second predetermined limits are both determined at least in part based on the determined commanded lateral acceleration.

20. The system of claim 18, wherein the hybrid control system is further configured to disable regenerative braking when either of the following conditions is present:
   the maximum rear wheel slip exceeds a third predetermined limit; or
   the maximum real wheel slip exceeds the minimum front wheel slip by a fourth predetermined limit; and
   wherein the third and fourth predetermined limits are both determined at least in part based on the determined commanded lateral acceleration.

* * * * *